United States Patent
Hatton (10) Patent No.: US 10,104,203 B2
(45) Date of Patent: *Oct. 16, 2018

(54) METHOD AND APPARATUS FOR SEAMLESS APPLICATION PORTABILITY OVER MULTIPLE ENVIRONMENTS

(71) Applicant: FORD GLOBAL TECHNOLOGIES, LLC, Dearborn, MI (US)

(72) Inventor: David Anthony Hatton, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,452

(22) Filed: Sep. 29, 2016

(65) Prior Publication Data

US 2017/0019503 A1    Jan. 19, 2017

Related U.S. Application Data

(63) Continuation of application No. 13/833,281, filed on Mar. 15, 2013, now Pat. No. 9,479,601.

(51) Int. Cl.
*H04L 29/08* (2006.01)
*H04W 4/00* (2018.01)
(Continued)

(52) U.S. Cl.
CPC ............. *H04L 67/34* (2013.01); *H04L 67/12* (2013.01); *H04L 67/148* (2013.01); *H04L 67/18* (2013.01);
(Continued)

(58) Field of Classification Search
CPC ........ H04L 67/94; H04L 67/12; G08B 25/016
(Continued)

(56) References Cited

U.S. PATENT DOCUMENTS 6,366,202 B1    4/2002   Rosenthal
6,526,335 B1 *  2/2003   Treyz ..................... G01C 21/26
                                              307/10.1
(Continued)

FOREIGN PATENT DOCUMENTS

WO        2011035427 A1    3/2011

OTHER PUBLICATIONS

Bose R, Brakensiek J, Park KY. Terminal mode: transforming mobile devices into automotive application platforms. InProceedings of the 2nd International Conference on Automotive User Interfaces and Interactive Vehicular Applications Nov. 11, 2010 (pp. 148-155). ACM.*

(Continued)

*Primary Examiner* — Ranodhi Serrao
*Assistant Examiner* — James N Fiorillo
(74) *Attorney, Agent, or Firm* — Jennifer Stec; Brooks Kushman P.C.

(57) ABSTRACT

A system includes a processor configured to receive data, gathered by a vehicle, for use by a mobile application. The processor is further configured to receive instructions from the application interacting with the vehicle, for continuing usage in the extra-vehicular environment, utilizing the received data. Also, the processor is configured to determine that a mobile device, containing the processor, has left the vehicle. Additionally, the processor is configured to execute the instructions to continue application functionality while the mobile device remains out of contact with the vehicle in the extra-vehicular environment.

17 Claims, 4 Drawing Sheets (51) Int. Cl.
    *H04W 56/00* (2009.01)
    *H04W 4/04* (2009.01)
    *G06F 17/00* (2006.01)

(52) U.S. Cl.
    CPC ............. *H04W 4/00* (2013.01); *H04W 4/046* (2013.01); *H04W 56/00* (2013.01); *H04W 56/001* (2013.01); *G06F 17/00* (2013.01)

(58) Field of Classification Search
    USPC .................................. 709/201, 223; 340/989
    See application file for complete search history.

(56) References Cited

U.S. PATENT DOCUMENTS

| | | | |
|---|---|---|---|
| 6,573,833 B1 | 6/2003 | Rosenthal | |
| 7,047,117 B2 | 5/2006 | Akiyama et al. | |
| 7,207,041 B2 | 4/2007 | Elson et al. | |
| 7,266,435 B2 | 9/2007 | Wang et al. | |
| 7,505,784 B2 | 3/2009 | Barbera | |
| 7,602,782 B2 | 10/2009 | Doviak et al. | |
| 7,801,941 B2 | 9/2010 | Conneely et al. | |
| 8,121,802 B2 | 2/2012 | Grider et al. | |
| 8,131,458 B1 | 3/2012 | Zilka | |
| 8,290,701 B2 | 10/2012 | Mason et al. | |
| 9,082,239 B2* | 7/2015 | Ricci | B60Q 1/00 |
| 9,720,680 B2* | 8/2017 | Diedrich | G06F 8/65 |
| 2002/0098853 A1 | 7/2002 | Chrumka | |
| 2003/0079123 A1 | 4/2003 | Mas Ribes | |
| 2003/0147534 A1 | 8/2003 | Ablay et al. | |
| 2004/0203660 A1 | 10/2004 | Tibrewal et al. | |
| 2004/0260438 A1 | 12/2004 | Chernetsky et al. | |
| 2004/0267585 A1 | 12/2004 | Anderson et al. | |
| 2005/0091408 A1 | 4/2005 | Parupudi et al. | |
| 2005/0177635 A1 | 8/2005 | Schmidt et al. | |
| 2006/0150197 A1 | 7/2006 | Werner | |
| 2006/0156315 A1 | 7/2006 | Wood et al. | |
| 2006/0190097 A1 | 8/2006 | Rubenstein | |
| 2006/0287787 A1 | 12/2006 | Engstrom et al. | |
| 2006/0287821 A1 | 12/2006 | Lin | |
| 2007/0016362 A1 | 1/2007 | Nelson | |
| 2007/0042809 A1 | 2/2007 | Angelhag | |
| 2007/0042812 A1 | 2/2007 | Basir | |
| 2007/0050854 A1 | 3/2007 | Cooperstein et al. | |
| 2007/0132572 A1 | 6/2007 | Itoh et al. | |
| 2007/0294625 A1 | 12/2007 | Rasin et al. | |
| 2008/0086544 A1 | 4/2008 | Meisels et al. | |
| 2008/0148374 A1 | 6/2008 | Spaur et al. | |
| 2008/0220718 A1 | 9/2008 | Sakamoto et al. | |
| 2008/0313050 A1 | 12/2008 | Basir | |
| 2009/0010448 A1 | 1/2009 | Voto et al. | |
| 2009/0075624 A1 | 3/2009 | Cox et al. | |
| 2009/0106036 A1 | 4/2009 | Tamura et al. | |
| 2009/0117890 A1 | 5/2009 | Jacobsen et al. | |
| 2009/0140064 A1 | 6/2009 | Schultz et al. | |
| 2009/0156182 A1 | 6/2009 | Jenkins et al. | |
| 2009/0228908 A1 | 9/2009 | Margis et al. | |
| 2009/0253466 A1 | 10/2009 | Saito et al. | |
| 2009/0318119 A1 | 12/2009 | Basir | |
| 2010/0063670 A1 | 3/2010 | Brzezinski et al. | |
| 2010/0094996 A1 | 4/2010 | Samaha | |
| 2010/0098853 A1 | 4/2010 | Hoffman et al. | |
| 2010/0157061 A1 | 6/2010 | Katsman et al. | |
| 2010/0216509 A1* | 8/2010 | Riemer | H04M 1/72577 455/557 |
| 2010/0234071 A1 | 9/2010 | Shabtay et al. | |
| 2010/0306309 A1 | 12/2010 | Santori et al. | |
| 2011/0060517 A1 | 3/2011 | Kono et al. | |
| 2011/0087385 A1 | 4/2011 | Bowden et al. | |
| 2011/0105097 A1 | 5/2011 | Tadayon et al. | |
| 2011/0110530 A1 | 5/2011 | Kimura | |
| 2011/0112762 A1 | 5/2011 | Gruijters et al. | |
| 2011/0185390 A1 | 7/2011 | Faenger et al. | |
| 2011/0195659 A1 | 8/2011 | Boll et al. | |
| 2011/0219105 A1* | 9/2011 | Kryze | G06F 15/16 709/223 |
| 2011/0275358 A1 | 11/2011 | Faenger | |
| 2011/0294466 A1 | 12/2011 | Tang et al. | |
| 2011/0296037 A1 | 12/2011 | Westra et al. | |
| 2011/0301839 A1* | 12/2011 | Pudar | H04W 4/04 701/408 |
| 2012/0054300 A1 | 3/2012 | Marchwicki et al. | |
| 2012/0064917 A1 | 3/2012 | Jenkins et al. | |
| 2012/0065815 A1 | 3/2012 | Hess | |
| 2012/0079002 A1 | 3/2012 | Boll et al. | |
| 2012/0084292 A1 | 4/2012 | Liang et al. | |
| 2012/0243528 A1* | 9/2012 | Frye | H04W 56/00 370/350 |
| 2013/0018705 A1 | 1/2013 | Heath et al. | |
| 2013/0137415 A1* | 5/2013 | Takikawa | H04W 4/046 455/418 |
| 2013/0265178 A1* | 10/2013 | Tengler | H04W 4/00 340/989 |
| 2014/0012497 A1* | 1/2014 | Pierfelice | G01C 21/20 701/454 |
| 2014/0107864 A1* | 4/2014 | Cecchini | G06F 17/00 701/2 |
| 2014/0277937 A1 | 9/2014 | Scholz et al. | |
| 2015/0363986 A1 | 12/2015 | Hoyos et al. | |
| 2016/0129883 A1* | 5/2016 | Penilla | B60R 25/305 348/148 |
| 2017/0197617 A1* | 7/2017 | Penilla | B60W 30/09 |

OTHER PUBLICATIONS

Chun BG, Maniatis P. Dynamically partitioning applications between weak devices and clouds. InProceedings of the 1st ACM Workshop on Mobile Cloud Computing & Services: Social Networks and Beyond Jun. 15, 2010 (p. 7). ACM.*

Bose R, Brakensiek J, Park KY. Terminal mode: transforming mobile devices into automotive application platforms. InProceedings of the 2nd International Conference on Automotive User Interfaces and Interactive Vehicular Applications Nov. 11, 2010 (pp. 148-155 ). ACM. (Year: 2010).*

Chun BG, Maniatis P. Dynamically partitioning applications between weak devices and clouds. InProceedings of the 1st ACM Workshop on Mobile Cloud Computing & Services: Social Networks and Beyond Jun. 15, 2010 (p. 7). ACM. (Year: 2010).*

U.S. Patent Office, Non-Final Office Action, for corresponding U.S. Appl. No. 13/833,281, filed Mar. 15, 2013, dated Apr. 17, 2015, 17 pages.

U.S. Patent Office, Final Office Action, for corresponding U.S. Appl. No. 13/833,281, filed Mar. 15, 2013, dated Mar. 7, 2016, 22 pages.

* cited by examiner

METHOD AND APPARATUS FOR SEAMLESS APPLICATION PORTABILITY OVER MULTIPLE ENVIRONMENTS

CROSS-REFERENCE TO RELATED APPLICATIONS

This application is a continuation of U.S. application Ser. No. 13/833,281, filed Mar. 15, 2013, now U.S. Pat. No. 9,479,601, issued Oct. 25, 2016, which application is hereby incorporated by reference in its entirety.

TECHNICAL FIELD

The illustrative embodiments generally relate to a method and apparatus for seamless application portability over multiple environments.

BACKGROUND

Many vehicular computing systems now provide advanced functionality to a user while the user travels within the vehicle. Navigation, musical playback, even limited access to internet data and calendar functions can be provided. When integrated with the nature of vehicular travel, countless opportunities are presented for improvements to the driving experience. Typically, however, the experience ends when the user leaves the vehicle.

U.S. Patent Application 2006/0265534 generally relates to a data transfer device which controls data transfer between a first memory device and a second memory device, includes a first transfer arbiter circuit and a second transfer arbiter circuit. The first transfer arbiter circuit outputs, in response to a transfer instruction for transfer of data from the first memory device to the second memory device, first transfer instructions to transfer data in a first transfer unit in an order of addresses. The second transfer arbiter circuit outputs, in response to the first transfer instruction, second transfer instructions to transfer the data of the first transfer unit in a second transfer unit smaller than the first transfer unit. The second transfer arbiter circuit outputs the second transfer instruction in an order of accessible addresses in the first and second memory devices U.S. Patent Application 2009/0019240 generally relates to an information processing apparatus and method for enabling efficient content download and transfer processing operations. In downloading content, a content identifier thereof is acquired, a particular piece of content subject to transfer to an external device is identified on the basis of the acquired content identifier, the identified content is retrieved from a data storage block, and the retrieved content is transferred to the external device or written to an information recording medium, so that the processing of content downloading, the processing of content transfer to an external device and content writing to an information recording medium such as CD can be executed as a sequence of processing operations, thereby providing significantly efficient content download and content transfer or content write processing operations.

U.S. Patent Application 2009/0210483 generally relates to methods for remotely controlling actions of a virtual world identity of a user include transmitting instructions to the virtual world identity of the user from a mobile terminal associated with a real world identity of the user. The instructions are transmitted as a voice call, a text message and/or an instant message (IM). Updated information associated with the transmitted instructions is received from the virtual world identity of the user at the mobile terminal. The updated information includes an identification of a condition triggering transmission of the updated information.

SUMMARY

In a first illustrative embodiment, a system includes a processor configured to receive data, gathered by a vehicle, for use by a mobile application. The processor is further configured to receive instructions from the application interacting with the vehicle, for continuing usage in the extra-vehicular environment, utilizing the received data. Also, the processor is configured to determine that a mobile device, containing the processor, has left the vehicle. Additionally, the processor is configured to execute the instructions to continue application functionality while the mobile device remains out of contact with the vehicle in the extra-vehicular environment. Mobile devices can include, but are not limited to, smart phones, cell phones, tablets, laptops and wearable digital smart glasses.

In a second illustrative embodiment, a computer-implemented method includes receiving data, gathered by a vehicle, for use by a mobile application. The method also includes receiving instructions from the application interacting with the vehicle, for continuing usage in the extra-vehicular environment, utilizing the received data. Further, the method includes determining that a mobile device, containing the processor, has left the vehicle. The method additionally includes executing the instructions to continue application functionality while the mobile device remains out of contact with the vehicle in the extra-vehicular environment.

In a third illustrative embodiment, a non-transitory computer readable storage medium stores instructions that, when executed by a processor, cause the processor to perform a method including receiving data, gathered by a vehicle, for use by a mobile application. The method also includes receiving instructions from the application interacting with the vehicle, for continuing usage in the extra-vehicular environment, utilizing the received data. Further, the method includes determining that a mobile device, containing the processor, has left the vehicle. The method additionally includes executing the instructions to continue application functionality while the mobile device remains out of contact with the vehicle in the extra-vehicular environment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
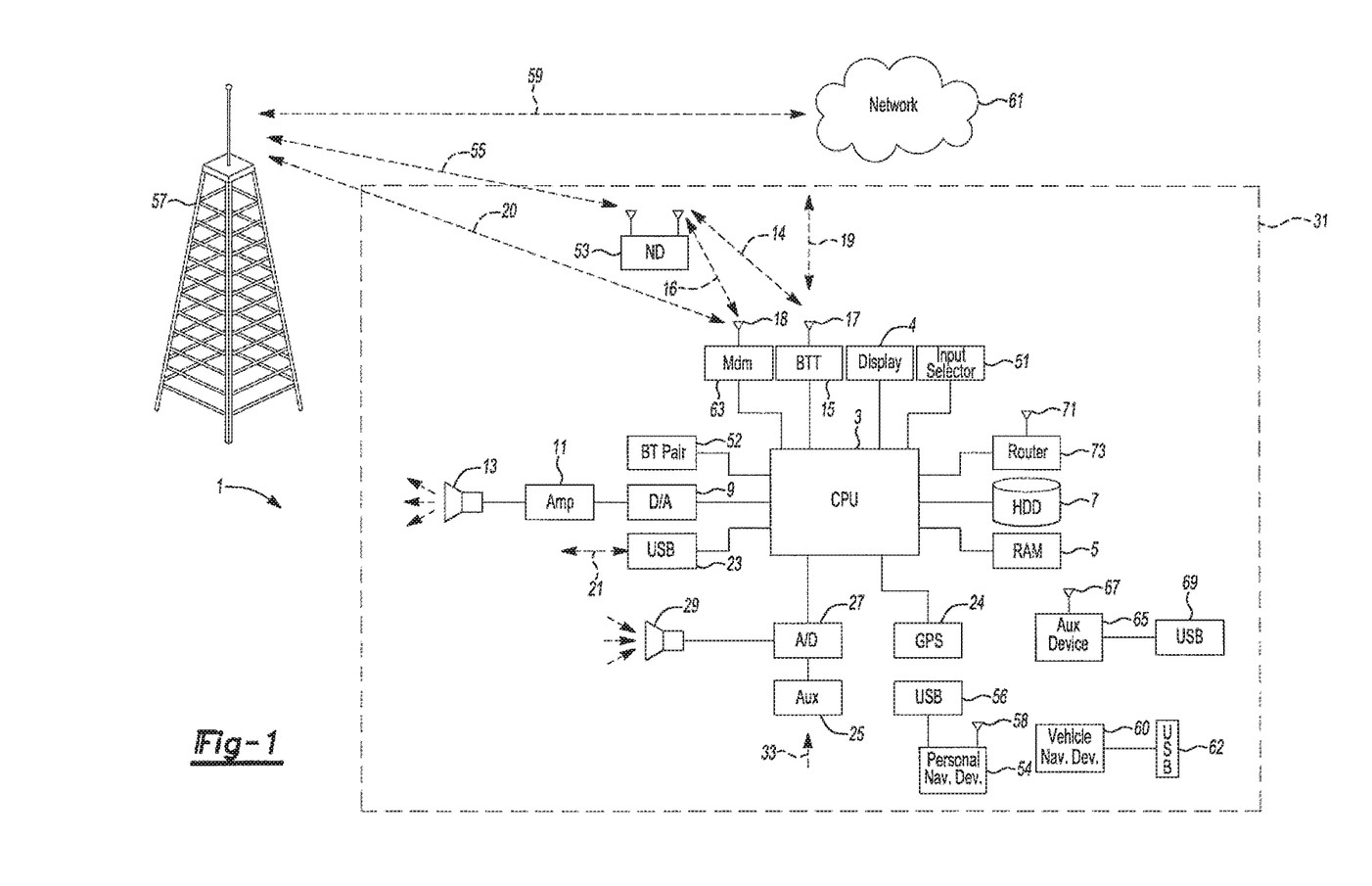
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Massive improvements have been made to vehicle connectivity and communication systems over the past few decades. In-vehicle infotainment systems provide remote connectivity, streaming music, customized advertisements, calendar management, hands free calling and a variety of other services. Additionally, automated emergency alerts (e.g., the system calls 911 in the case of a detected accident), vehicle navigation controls and various other connected services can be provided.

Vehicle infotainment systems, such as the Ford SYNC system, connect to wireless devices to obtain remote connectivity and access to applications running on the devices. Also, applications may be specifically developed for interfacing with a vehicle.

With all of these current systems and connectivity solutions, the in car and out of car experiences tend to be compartmentalized into their own environments. Vehicular interaction begins when a user enters a vehicle and ends when the user leaves the vehicle. User activity outside the vehicle is not combined with vehicular information.

In the illustrative embodiments, a seamless interaction between intra and extra vehicular activity is presented. Information from vehicular systems and relating to vehicle states, vehicular application interaction and other information can be passed to wireless device to continue an in-vehicle experience after a user leaves the vehicle. The wireless device can then perform a range of services based on the information, such as reminders, navigation and user updates. Then, when the user returns to the vehicle, further connectivity and information transfer updates the vehicle with the extra-vehicular activity. This information can be integrated into existing applications to improve the user experience.

Figure 2A:
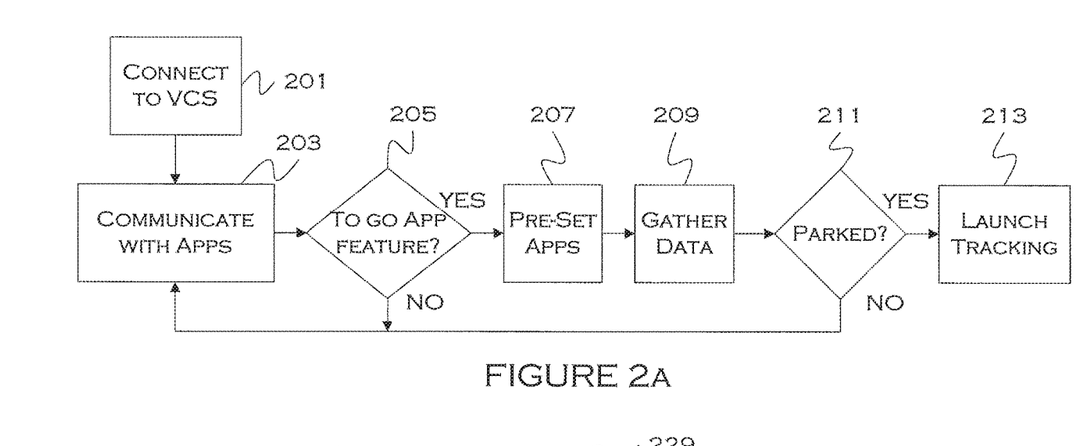
FIG. 2A shows an illustrative application preparation process.

FIG. 2A shows an illustrative application preparation process. In this illustrative example, a wireless device connects with the VCS 201. The wireless device can include, but is not limited to, a cellular phone, a tablet, a laptop, smart phone or other portable device. The connectivity in this process is handled by an application running on the wireless device. This application is capable of communicating with other applications running on the device, as well as applications running on the VCS. The application is further capable of obtaining information from vehicle subsystems, the CAN bus and any other appropriate sources.

In this illustrative embodiment the portability application communicates with other applications running on the mobile device, as well as applications running on the vehicle 203. For each application, it is determined whether the application has a "to go" feature included therewith 205. The to-go feature indicates that the application can benefit from a perpetuated experience. For example, without limitation, a vehicle navigation related application may include a shopping list. Accordingly, the vehicle may suggest stops along a route that relate to items on the shopping list (e.g., if a number of groceries are on the list, and a grocery store is passed, a recommendation may be made to stop).

If the user then stops at the store, and leaves the vehicle, the vehicular experience may end. But, if the grocery list is transmitted from the vehicle to the phone, the user can then access the list on the phone and check off groceries as they are purchased. When the user re-enters the vehicle, the information about which items were purchased can be transferred back to the vehicle, and the stored list can be updated.

In advanced cloud-connected navigation systems, it is possible to examine items on the grocery list and recommend stores that sell the items. For example, if a list contained milk and hamburger, the system might recommend a stop at a local grocery store to purchase the items on the list. When the user stops the vehicle, the grocery list may be transferred to a mobile device. If the user then purchases milk, and not hamburger, the user may note this on the mobile device.

When the user returns to the vehicle, the list may be transferred back to the vehicle for updating the list stored thereon. Once the list is updated, the vehicle system knows that only hamburger remains on the list. Resultantly, stores such as meat markets may now be recommended, as they provide additional options for completing the entire remaining list. This is just one example of how information can be transferred from the vehicle for remote use, used, updated and transferred back to the vehicle for continued use.

This example was provided for illustrative purposes only. Any number of conceivable portable situations can be envisioned where information can be usefully transferred from the vehicle to a mobile device, further utilized while the device is out of the vehicle, and then, if desired, transferred back to the vehicle for additional use when the user returns to the vehicle.

For each application that can utilize vehicular information when the user leaves the vehicle, the process may set up a function to gather useful data related to the application 207. Since there may be a limited amount of time to gather useful information when the vehicle is parked, the process may pre-gather data as the trip continues 207. Once the vehicle is parked 211, the application may engage a tracking mode for continued use of information while the user is out of the vehicle 213.

Figure 2B:
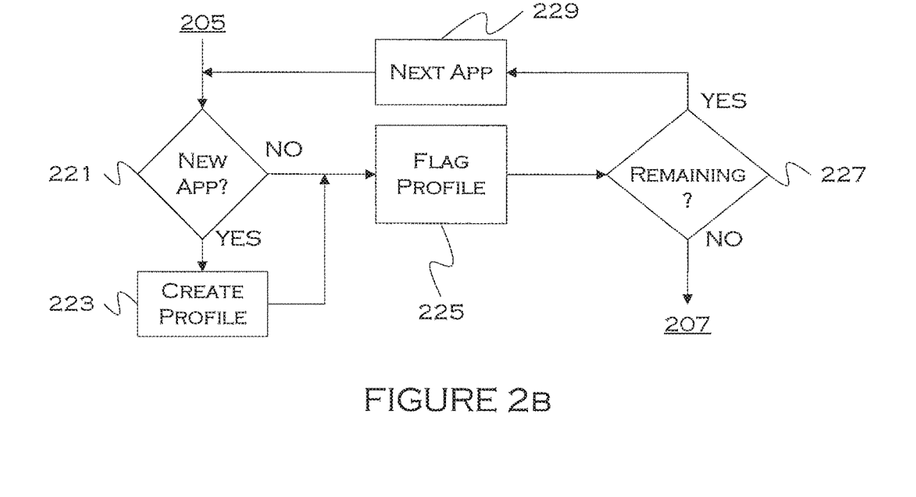
FIG. 2B shows an illustrative embodiment application flagging process.

FIG. 2B shows an illustrative embodiment application flagging process. Each running application (or each application) is examined to see if there is an out-of-vehicle functionality associated therewith. As each application is examined, the process checks to see if there is a profile associated with the application 221. The profile can be used to store information that is used in both the in and out of vehicle states. This information, as updated, keeps the applications up to date so that their functionality continues uninterrupted and accurately.

For each new application that has a to-go feature, the process may create a new profile for information storage 223. For each previously existing application, the currently existing profile may be accessed. For each profile accessed or created (corresponding to a currently running application or feature that has to-go options), the process may flag the profile for information gathering 225. If any application or features remain 227, the process proceeds to the next application for profile creation or flagging, if the application has a to-go feature associated therewith.

Figure 3:
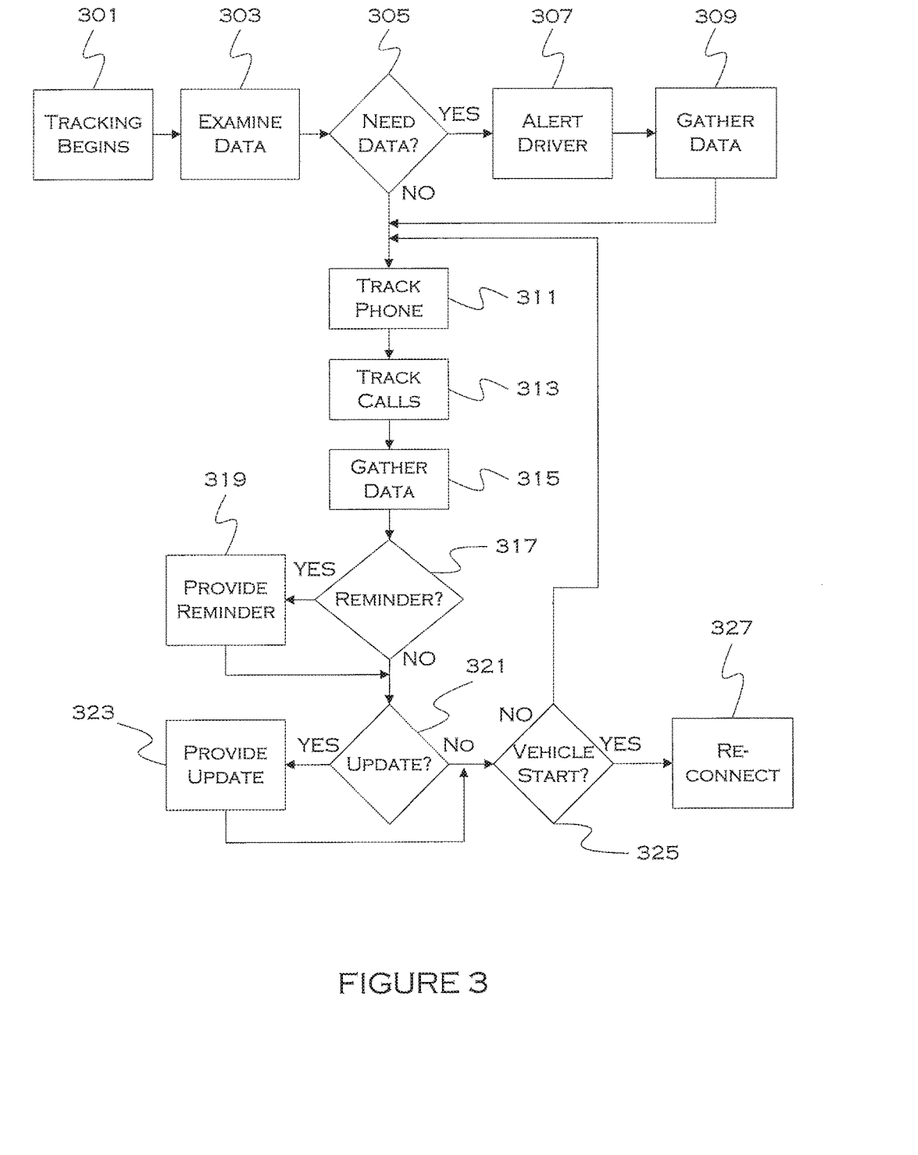
FIG. 3 shows an illustrative process for off-board tracking and updating.

FIG. 3 shows an illustrative process for off-board tracking and updating. Once the mobile device has been provided with the information for off-board use, the mobile application engages a tracking mode 301. This mode will gather the data necessary for the various applications as the user travels. Further, the portability application can instruct presentation of information to a user whenever an application would present the information.

In one illustrative embodiment, the portability application acts in a manner similar to that of the VCS. That is, whenever a secondary application running on the mobile device outside the vehicle outputs information that would be output on a vehicle display, the portability application provides a proxy for the vehicle computing system and functions to output the information on a mobile display. In other instances, the secondary application may output the information to the mobile display without aid of the portability application.

Once the tracking mode is engaged, the process examines the data that has been provided to the portability application 303. In some instances, additional data may be required for the application to function while the user is on-the-go 305. For example, if a data transfer/gathering was not completed while the vehicle was in drive, the user may be notified 307 not to power down the vehicle until the data transfer is complete. The process can then gather any additional data needed 309 before the user leaves the vehicle.

Once the user leaves the vehicle, several functions of the portability application may be engaged. First, the application may engage tracking of the phone 311. That is, the portability application may log GPS coordinates, as well as provide current GPS coordinates to any secondary applications running on the phone, in a manner similar to that of the VCS. As previously stated, the secondary applications can draw functionality from the phone directly, or the portability application can utilize the phone processing power and functionality (e.g. GPS capability) to act as a proxy for the VCS.

The coordinate logging is provided in some instances so that the vehicle can be notified of where the user has traveled during the out of vehicle experience. For example, if a calendar appointment was sent in-vehicle on a vehicle calendar function for 2:30 PM at 100 Smith Lane. If the user leaves the vehicle at 1:30 PM, the calendar appointment may be transferred to the phone. At some point near 2:30 PM, the user may be provided with a reminder for the appointment, just as if the user were in the vehicle. Further, the GPS functionality may record that the user reached 100 Smith Lane (on foot, for example) around 2:30 PM. Thus, presumably, the appointment was met. The phone can record this incident, and, when the user returns to the vehicle, inform the vehicle that the user was present at 100 Smith Lane at 2:30 PM. Accordingly, the vehicle can update the calendar appointment as having been met, and doesn't need to report to the user that an appointment may have been missed.

Through this tracking functionality, any applications utilizing GPS coordinates in-vehicle can be continued in the extra-vehicle experience, and/or can be updated when the user returns to the vehicle environment.

Additionally or alternatively, call tracking may be provided 313. This functionality can track made calls, missed calls, sent texts and unviewed texts. This information can be useful for vehicle notification functions. For example, without limitation, made calls can remove call-back reminders (as can sent texts) from a call back reminder function, missed calls can be added to the call-back reminder function, and unviewed texts can be added to text alert functions.

Further, the portability application may engage in general data gathering 315. This can include, but is not limited to, data requested by applications (the grocery list example), data useful for in-vehicle applications, and any other data that the phone is capable of automatically acquiring or that would require input. For example, if a coupon function provided a coupon to the phone, redemption of the coupon could be reported back to an advertising function in the vehicle, to assist in deciding which advertisements should be selected. Similarly, the advertising function may have provided information to the phone before the user left the vehicle, so that advertisements selected while out of the vehicle would likely correspond to areas of the user's interest, based on past observations.

In some instances, one or more applications may need to provide a user with a reminder 317. For example, if the advertising in-vehicle function provided a McDonald's coupon, and the user walked close to a McDonald's, the portability application may act as a proxy for the in-vehicle application and remind 319 the user that they have a redeemable coupon. Alternatively, a secondary advertising application on the mobile device may provide the reminder 319.

Similarly, there may be one or more updates needed to existing information 321. Again, as with the grocery list, if the user completes a shopping trip and the list has had several items checked off, the process may update the data relevant to the grocery list 323, so that future shopping recommendations are only based on items remaining to be purchased.

This gathering and update process can continue until the vehicle starts up again 325, at which point the mobile device reconnects to the VCS 327. At this point, all gathered and updated data, as well as application states, can be transferred back to the vehicle.

Figure 4:
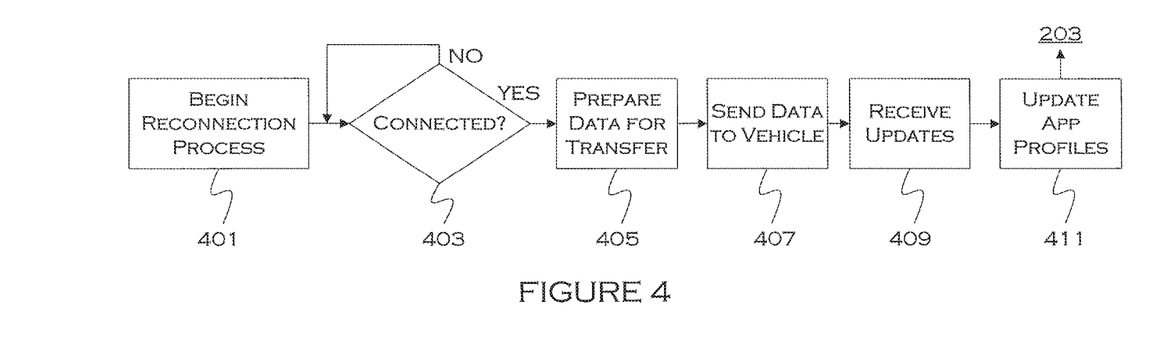
FIG. 4 shows an illustrative for importing data back to a vehicle.

FIG. 4 shows an illustrative for importing data back to a vehicle. Once the mobile device has been connected back to the vehicle, a reconnection process for data transfer can begin 401. The process waits until a connection has been established 403, and then prepares any data on the mobile device for transfer to the vehicle 405. Since the device may have gathered some amount of data without specific intent for the data (e.g., tracked GPS coordinates), the device may attempt to determine which of this data is actually desired by the vehicle. In other instances, all gathered data may be sent to the vehicle for processing.

Once any needed data preparation is completed, the device sends the data to the vehicle 407. The vehicle will then process the data accordingly, using it to update any applications running on the vehicle, as well as logging any data that needs to be logged. This may also cause one or more updates to be sent to applications running on the mobile device. In such a case, the mobile device will receive the updates coming from the vehicle 407, and use these to update the application profiles on the mobile device, as appropriate.

Figure 5:
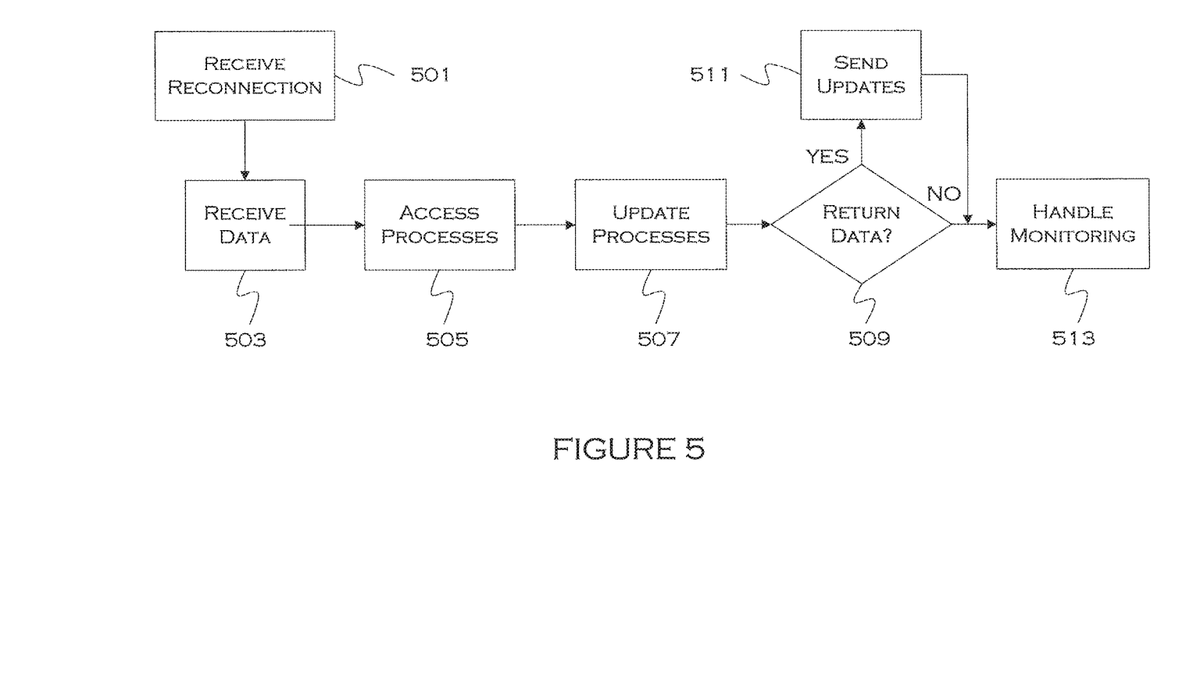
FIG. 5 shows an illustrative vehicle re-entry update process.

FIG. 5 shows an illustrative vehicle re-entry update process. In this illustrative example, the vehicle receives the reconnection request from the mobile device 501. Once the mobile device has completed any data preparation, the vehicle receives 503 the data transferred from the mobile device. This data corresponds to data gathered and generated while the mobile device was used in an extra-vehicular manner.

The vehicle can then access any processes and applications 505 that can benefit from the data, and update the processes and application 507 as needed. In the calendar example previously given, the vehicle would receive the locations of the user and the various times associated with each location. This could then be cross referenced with the calendar application to "guess" at which appointments were met or not met. Similarly, with the grocery application, the grocery list information could be used to update an internal grocery list. These are just two non-limiting examples of how a seamless flow of application usage and data gathering from the vehicle experience, to the extra-vehicular experience, and back can benefit a user.

In some instances, changes to internal vehicular data, based on the received data, may cause updates to a mobile application. In these instances, it may be desirable to return some subset of data or update instructions to the mobile device 509. Any needed data can be transferred 511 and then the vehicle can return to monitoring the processes and applications 513, now that the user has returned to the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a mobile device connected to a network;
a vehicle computing system (VCS) located in a vehicle further comprising:
a transceiver to communicate to the network;
a memory; and
a processor coupled to the memory, wherein the memory stores executable instructions that when executed by the processor performs the steps to:
identify a vehicle-gathered data-type used by a vehicle-executing application, wherein an application profile associated with the vehicle-executing application is accessed to determine whether data of the data-type can be gathered outside of the vehicle;
upon determining that the data of the data-type can be gathered outside of the vehicle, instruct the connected mobile device to gather data of the data-type when the device loses communication with the vehicle, wherein the application profile includes an indicator to provide that the vehicle-executing application can utilize the data of the data-type to be gathered while the mobile device is away from the vehicle;
receive a data transfer request from the mobile device, responsive to the mobile device returning to the vehicle and re-establishing communications, after the mobile device lost communication with the vehicle;
receive gathered data of the data-type from the mobile device, responsive to acceptance of the transfer request, wherein the transfer request is accepted upon detection of the indicator provided in the application profile associated with the vehicle-executing application; and
provide the gathered data of the data-type to the vehicle-executing application.

2. The system of claim 1, wherein the processor is configured to formulate the instruction to gather data of the specified type based on data gathered by the vehicle for use by the application while the vehicle is in use.

3. The system of claim 1, wherein the data includes GPS coordinates tracking device travel while the device was away from the vehicle.

4. The system of claim 3, wherein the data includes time data associated with the GPS coordinates indicating when the mobile device was at a particular GPS coordinate location.

5. The system of claim 1, wherein the data includes call data.

6. A system comprising:
a mobile device connected to a network and further comprising a mobile device proxy application;
a vehicle computing system (VCS) located in a vehicle further comprising:
a transceiver to communicate to the network;
a memory; and
a processor coupled to the memory, wherein the memory stores executable instructions that when executed by the processor performs the steps to:
determine that an on-vehicle application has portable functionality associated therewith, to perpetuate an application experience on the mobile device away from the vehicle wherein an application profile associated with the on-vehicle application is accessed to determine whether data related to the on-vehicle application can be utilized by the mobile device outside of the vehicle;
upon determining that the data related to the on-vehicle application can be utilized by the mobile device outside of the vehicle, transfer the data, stored in the application profile associated with the on-vehicle application, to the mobile device proxy application;
instruct the mobile device proxy application to provide on-vehicle application functionality replication based on the transferred data, such that data is output by the mobile device when the on-vehicle application would have output the data, wherein the on-vehicle application functionality replication includes logging GPS coordinates and providing current GPS coordinates to any secondary applications running on the mobile device and gathering data related to the on-vehicle application;

receive data from the mobile device proxy application acquired during a period that the mobile device proxy application was providing on-vehicle application functionality replication; and upon detection of an indicator provided in the application profile associated with the on-vehicle application, update the data related to the on-vehicle application.

7. The system of claim 6, wherein the data includes merchant offer data.

8. The system of claim 6, wherein the data includes event reminder data.

9. The system of claim 6, wherein the data includes data designating a triggered response at a pre-specified location.

10. The system of claim 6, wherein the data includes data designating a triggered response at a pre-specified time.

11. A system comprising:

a vehicle computer connected to a network;

a mobile device connected to the network to communicate with the vehicle computer and further comprising a processor coupled to a memory, wherein the memory stores executable instructions that when executed by the processor performs the steps:

receive, from a vehicle computer, instructions for use by a portability application executing on the mobile device, wherein the portability application communicates with one or more mobile applications and one or more on-vehicle applications;

receive instructions to execute a portability function as a proxy for the vehicle computer, wherein the vehicle computer accesses an application profile associated with an on-vehicle application to determine that the on-vehicle application has portable functionality;

execute the portability application while the mobile device is away from a vehicle, such that the mobile device processor causes data gathering or output, based on the instructions, as though the vehicle computer were present;

determine that the mobile device has wirelessly reconnected to a vehicle computer, after receiving the instructions; and responsive to the reconnection, transfer any data gathered in accordance with the instructions to the vehicle computer, wherein the vehicle computer detects an indicator provided in the application profile associated with the on-vehicle application to update data related to the on-vehicle application.

12. The system of claim 11, wherein the instructions include data defining conditions for output.

13. The system of claim 12, wherein the conditions for output include a device location.

14. The system of claim 12, wherein the conditions for output include a time of day.

15. The system of claim 11, wherein the instructions include data defining conditions for data gathering.

16. The system of claim 15, wherein the conditions for data gathering include device movement for gathering device GPS coordinates.

17. The system of claim 15, wherein the conditions for data gathering include device communication for gathering communication related data.

\* \* \* \* \*